Nov. 22, 1960  L. E. LEFEVRE  2,960,725
PROCESS FOR PREPARING THERMOPLASTIC
TAPES OF VARIED CROSS-SECTIONS
Filed March 21, 1957
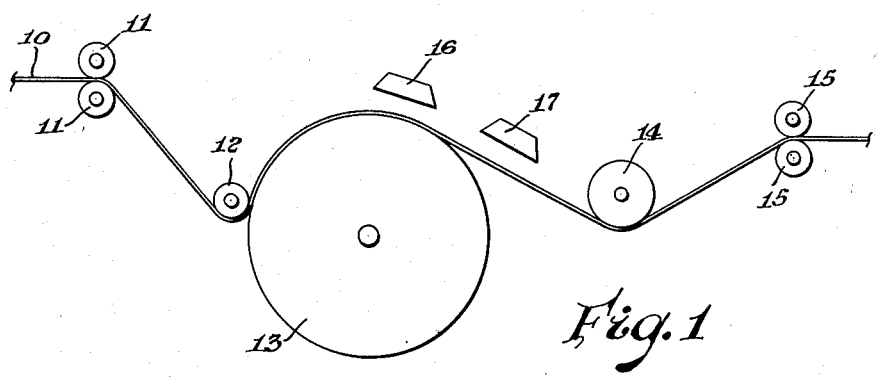
Fig. 1
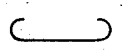 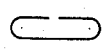   
Fig. 2  Fig. 3  Fig. 4  Fig. 5  Fig. 6
INVENTOR.
Lloyd E. Lefevre
BY
Griswold & Burdick
ATTORNEYS

# United States Patent Office 2,960,725
Patented Nov. 22, 1960

2,960,725

PROCESS FOR PREPARING THERMOPLASTIC TAPES OF VARIED CROSS-SECTIONS

Lloyd E. Lefevre, Bay City, Mich., assignor to The Dow Chemical Company, Midland, Mich., a corporation of Delaware Filed Mar. 21, 1957, Ser. No. 647,645

5 Claims. (Cl. 18—48)

This invention relates to a process for preparing thermoplastic tapes or partially flat filaments of various cross-sections. More particularly it relates to such a process utilizing strips of foil made from certain vinylidene chloride copolymer latexes.

When a polymer latex is used for preparing any continuous coherent articles, the initial solid products, whether formed by coagulation or by simple deposition and drying of the latex, are very weak. In that state films and tapes are less fragile than fibrous forms and are easier to handle in fusion and other processing operations prior to fusion. The conversion of tapes prepared from polymer latexes into filamentary articles is known. The common method for making such articles is to prepare a continuous, coherent, fused film, slit that film into tapes, and to convert the tapes into the filamentary articles by drawing the tapes on a bias over a heated roll causing the tapes to twist or roll up into a filamentary form. That method results in round filaments. However, for many decorative purposes and for increased covering power when woven, it is frequently desired to have filaments of other cross sections, such as flat, beaded, dog-bone and others. The unmodified flat tapes have poor tear strength and tend to crush when woven giving little more covering power than round filaments. In the past it was necessary to extrude thermoplastics into such shapes, and that extrusion required a separate die to form each shape. It would be desirable if the tapes prepared from latexes could be shaped into some of those forms.

The provision of a process for preparing tapes of various cross-sections is the principal object of this invention.

It is a further object to prepare such tapes from certain normally crystalline polymer or copolymer latexes.

The above and related objects are accomplished by the process comprising as essential sequential steps the localized coagulation of a film forming polymer latex of a normally crystalline polymer into a flat continuous, coherent, coagulum having a porosity as will be later described, washing said coagulum free of coagulant, drying said coagulum below its fusion temperature, and finally subjecting the flat continuous, coherent, porous coagulum to heat directed at one side of the ribbon to fuse together or to coalesce the particles of the coagulum and simultaneously to roll the edges of the ribbon without causing fusion together of the layers.

The latexes which are useful in the process of this invention are those film-forming, electrolyte-coagulable polymer latexes of any crystalline polymer capable of forming a continuous, coherent, porous, coagulum. The normally crystalline vinylidene chloride polymers, and particularly those copolymers composed predominantly of vinylidene chloride and also containing from about 1 to 8 percent acrylonitrile, have been found to be particularly useful and are accordingly preferred.

To obtain useful continuous coherent articles it is desirable to have the latex contain from about 30 to about 50 percent by weight of non-volatile solids. Latexes containing less than about 30 percent solids are uneconomical to prepare and continuous, coherent articles are difficult to prepare by simple deposition of such latexes. Latexes containing more than about 50 percent solids are also difficult to prepare and are extremely sensitive to storage and to mechanical shear and may coagulate prematurely. Best results are obtained when the latex contains from 30 to 40 percent by weight of solids. The latex solids are the main determinant of the porosity of the coagulum and it is the porosity obtained with the preferred solids contents which operate best in this process.

It is known that the preparation of continuous coherent articles by simple deposition from polymer latexes is most easily and satisfactorily accomplished when the majority of the individual particles of the latex have diameters in the range of from about 700 to 2000 Angstrom units. Latexes having particle sizes outside of the stated range may be used in the process, but they do not have as good stability or capability of deposition into the desired coagulum, and the results are erratic.

It is likewise known that the normally crystalline copolymers, when in latex form, must be predominantly in the amorphous state to arrive at continuous coherent articles. When such latexes are freshly prepared the copolymers are predominantly in that amorphous state, but crystallization begins immediately and progresses to a point or degree where the latex is no longer film forming by simple deposition. That crystallization is for all practical purposes irreversible, since the latex, having reached that limit of crystallinity, cannot be restored to its original state. Because of this crystallization effect it is preferred to use the latex as soon as possible after polymerization. If some time is desired, it is possible to retard the rate of crystallization by incorporating a minor amount of one of the monomers, such as acrylonitrile, into the freshly prepared latex.

The latexes are prepared by conventional emulsion polymerization procedures. Typically, the monomers are dispersed into an aqueous phase containing a ploymerization catalyst, such as potassium persulfate, and a quantity of an appropriate emulsifying agent. Polymerization is initiated thermally and the emulsion maintained while agitated. After the completion of polymerization the latex is filtered to remove any precoagulum and the latex may be post stabilized to mechanical shear by the addition of a further small amount of the same or different surface active agent.

The preparation of continuous, coherent, porous coagula is described in the concurrently filed application of which the present applicant is one of the co-inventors, U.S. Serial No. 647,632, filed March 21, 1957. In that application it is described that a solid, non-porous deposition base is wetted with an aqueous solution of an electrolyte coagulant and is then contacted with the latex. The excess latex is removed with a planiform air blast directed tangentially or at a slight angle to the wetted surface. The coagulum so formed is next washed to remove substantially all of the electrolyte coagulant, and finally dried at a temperature below the fusion temperature of the copolymer. This dried coagulum contains from about 40 to 75 percent porosity or void space, and is best described as a microporous film. As prepared on a base, the face of the coagulum which first touched the coagulant is of slightly greater porosity than the opposite face. Thus there is gradual density gradient through the film thickness. For those applications, such as filtration, which depend upon the porosity that is insignificant. However, in this process the recognition of this effect is important as will be later described.

The difference in the faces is easily determined by noting the relative reflectances.

For the subsequent steps of this process it is necessary to have tapes of the microporous coagulum. For most weaving operations these tapes should be about ⅛ inch in width although wider or narrower tapes may be used. Tapes having a width of from ⅟₁₆ to ½ inch have been employed in this process with equally successful results. Tapes having these widths may be prepared directly in the localized coagulation procedure, but it is more economical and practical to prepare a wide microporous coagulum and to slit that coagulum into the desired widths.

The microporous coagula and tapes may have additives incorporated therein by simply immersing the coagulum or tape in a solution of the desired additive until the appropriate amount has been absorbed. The coagulum or tape is then redried prior to further processing.

The subsequent described steps, which constitute the novel filament shaping process of this invention, are illustrated schematically in the annexed drawing. In this drawing:

Figure 1 illustrates in schematic elevation the essential sequential steps of the process and Figures 2 through 6 illustrate various filamentary cross-sections which it is possible to obtain with the process.

In operation a flat continuous, coherent, microporous tape 10 is passed through a pair of snubbing feed rolls 11 with the microporous surface up, thence around an idler roll 12. The tape 10 next passes over a preheat drum 13, to a supercooling roll 14, and is finally taken up by a pair of snubbing take up rolls 15. The feed rolls 11 and take up rolls 15 are operated at such relative peripheral speeds to maintain some tension on the tape 10 throughout the procedural steps. If desired tension sufficient to cause a hot stretch of up to about 3 to 1 may be applied. However it is preferred to apply only enough tension to prevent sag of the tape throughout the process.

The preheat drum 13 may be steam heated or heated in other conventional manner. The preheat drum 13 serves to reduce the length of exposure of the tape 10 to the conditions required for the simultaneous fusing and shaping steps and further serves to aid reproducibility by subjecting a tape 10 at a constant temperature to the subsequent steps. To aid in preheating it has been found to be desirable to mount a first radiant preheater 16 above the preheat drum 13 at a point shortly before the tape 10 leaves the preheat drum 13.

Shortly after the tape 10 is stripped from the preheat drum 13, it is subjected while unsupported to heat from a second radiant heater 17. This second radiant heater 17 is so positioned and operated as to direct heat at the more porous surface of the tape 10 at a temperature in excess of the fusion temperature of the copolymer forming the tape 10. It is the heat from this second radiant heater 17 which causes the simultaneous fusion and shaping of the tape 10 into the desired form. The higher the temperature at the surface of the tape 10 the greater will be the rolling of the edges. Thus as this temperature is increased the cross-section will progress from that illustrated in Figure 2 to that illustrated in Figure 6. To achieve this desired edge curling the heating should be practically instantaneous or of not more than a few seconds' duration. Heating for an appreciably longer time would seriously reduce the useful thermal life of any vinylidene chloride copolymer. Also, if the heat is directed at the less porous face of the tape, little edge curling will result. In addition it is a peculiar result of this process that, although the tape 10 is fused during exposure to the second radiant heater 17 the curled edges of the tape 10 do not fuse to each other. Thus, the edges of the tapes 10 are unfused and add resiliency to the tapes 10. If the heating were prolonged, some fusion of these edges would occur and result in a different product.

These results can only be obtained when the tape 10 fed into the process is of microporous unfused nature and also when the fusion and shaping are conducted simultaneously. When it is attempted to use films prepared by first fusing the coagulum and subjecting that fused film to the process, the film remains flat.

The temperatures at which the fusing and shaping should be conducted are between the fusion temperature of the copolymer and temperature at which decomposition of the copolymer is evident. These temperatures are easily determined by simple preliminary experiment.

The edge curling of this process is strictly a controlled lateral overlapping of the edges of the tapes and does not result in any longitudinal distortion of the tape.

Following shaping and supercooling the tapes may be subjected to any of the usual processing operations employed with filamentary articles. Thus, the tapes may be oriented, wound, and packaged.

The advantages of the process will be apparent from the following illustrative example wherein all parts and percentages are by weight.

*Example*

A latex was prepared by polymerizing in aqueous emulsion a monomeric material consisting of 97 percent vinylidene chloride and 3 percent acrylonitrile. The latex had an average particle size of about 1000 Angstrom units and contained about 36 percent solids. Within 24 hours of its preparation the latex was converted into a continuous, coherent, microporous coagulum by wetting a belt covered with a polysiloxane rubber with a 20 percent aqueous calcium chloride solution and contacting the wetted belt with the latex. The wet coagulum was washed free of the calcium chloride and dried at 130° C. Tapes ⅛ inch in width were cut from the coagulum. These tapes were passed between a pair of snubber rolls with the more porous surface up, around a steam heated drum and while in contact with the drum were further preheated with a radiant heater. The tapes were then passed in unsupported condition under a second radiant heater positioned ¾ inch from the film. After exposure to the second heater the tapes passed about a chilled roll to supercool the tapes and were finally passed through a second pair of snubbing rolls operated at a slightly faster peripheral speed than that of the feed rolls. The fusion temperature of the tapes was 175° C. When the second radiant heater was operated at 175° C. the result was a filamentary cross-section to that of Figure 2 of the annexed drawings. When the temperature was increased to 300° C. the cross-section was similar to that of Figure 6. Intermediate temperatures produced amounts of edge roll as in Figures 3, 4, and 5.

By way of contrast the microporous coagulum was first fused and then passed through the same steps. The fused film remained flat with no edge curling.

I claim:

1. A process for preparing thermoplastic tapes of unique cross-section comprising the exposure of only the more porous surface of thermoplastic, dried, microporous tape of a continuous coherent coagulum having a porosity gradient from one surface to the other to radiant heat at a temperature above the fusion temperature but below the temperature at which decomposition of the copolymer forming the tape is evident said exposure being for a time sufficient to effect fusion together of the particles in said coagulum while said tape is under tension at least sufficient to prevent sag of said tape whereby the edges of said tape are caused to curl spirally inwardly without coherence of the tape surfaces within the spirals and without coherence of each of the spirals to one another.

2. The process claimed in claim 1 wherein said tape is from 1/16 to 1/2 inch in width.

3. The process claimed in claim 1 wherein said tape is prepared by the localized coagulation of a latex of a copolymer of from 92 to 99 percent by weight of vinylidene chloride and correspondingly from 8 to 1 percent by weight of acrylonitrile.

4. A continuous process for preparing thermoplastic tapes of unique cross-section comprising as essential sequential steps (a) the feeding of a dried, microporous thermoplastic tape of a continuous coherent coagulum having a porosity gradient from one surface to the other and having from 40 to 75 percent porosity into a preheating zone, (b) then exposing only the more porous side of said tape to radiant heat at a temperature between the fusion and decomposition temperature of said tape for a time sufficient to effect fusion together of the particles in said coagulum and while said tape is under tension at least sufficient to prevent sag of said tape, whereby the edges of said tape are caused to curl spirally inwardly without coherence of the tape surfaces within the spirals and without coherence of each of the spirals to one another, and (c) finally, supercooling said tape.

5. The process claimed in claim 4 wherein said tension is no more than that which causes a 3 to 1 hot stretch of said tape.

References Cited in the file of this patent

UNITED STATES PATENTS

| | | |
|---|---|---|
| 1,589,898 | Reeves | June 22, 1926 |
| 2,858,186 | Frost | Oct. 28, 1958 |